United States Patent
Peidous et al.

(10) Patent No.: US 10,690,600 B1
(45) Date of Patent: Jun. 23, 2020

(54) ANALYZER OF TECHNOLOGICAL SURFACES

(71) Applicants: Vassili Peidous, Liberty Township, OH (US); Nina Peydus, Liberty Township, OH (US)

(72) Inventors: Vassili Peidous, Liberty Township, OH (US); Nina Peydus, Liberty Township, OH (US)

(*) Notice: Subject to any disclaimer, the term of this patent is extended or adjusted under 35 U.S.C. 154(b) by 0 days.

(21) Appl. No.: 16/565,356

(22) Filed: Sep. 9, 2019

Related U.S. Application Data

(60) Provisional application No. 62/739,328, filed on Sep. 30, 2018.

(51) Int. Cl.
| | |
|---|---|
| *G01N 21/88* | (2006.01) |
| *G01N 21/956* | (2006.01) |
| *G01N 21/47* | (2006.01) |
| *G01N 21/95* | (2006.01) |

(52) U.S. Cl.
CPC ......... *G01N 21/8806* (2013.01); *G01N 21/47* (2013.01); *G01N 21/9501* (2013.01); *G01N 21/956* (2013.01); *G01N 2021/95676* (2013.01)

(58) Field of Classification Search
CPC .............. G01N 21/8806; G01N 21/47; G01N 21/9501; G01N 21/956
USPC .................................................. 356/237.2
See application file for complete search history.

(56) References Cited

U.S. PATENT DOCUMENTS

| | | | |
|---|---|---|---|
| 2014/0118730 A1* | 5/2014 | Kavaldjiev | ......... H01L 27/1446 356/237.5 |
| 2014/0139829 A1* | 5/2014 | Wolters | .............. G01N 21/9501 356/237.5 |
| 2014/0278188 A1* | 9/2014 | Yuditsky | ............ G01N 21/9501 702/104 |

* cited by examiner

*Primary Examiner* — Hung Nguyen

(57) ABSTRACT

An apparatus for analyzing technological surfaces is provided. The apparatus has a laser scanner, an electronic control and data processing system and a transport system for setting the scanner and analyzed surfaces in a slow relative motion. The scanner is implemented in a compact form and includes a spinning hollow shaft that carries a laser module and a collector of laser radiation scattered on analyzed surfaces. The collected radiation is transmitted to a photodetector through the bore in the hollow shaft. The design of the scanner enables cost effective characterization of analyzed surfaces with high throughput and precision. The portability of the analyzer allows its integration into production equipment for in-situ product inspection or equipment self-diagnostics.

20 Claims, 8 Drawing Sheets

ANALYZER OF TECHNOLOGICAL SURFACES

FIELD OF THE INVENTION

The present invention belongs to the field of process technologies and tools for analyzing the quality of workpieces, products and equipment parts. In particular, it relates to nanotechnologies of manufacturing and inspection of substrates, semiconductor wafers and photolithography reticles. The invention is also targets applications of monitoring the health of equipment in production lines for manufacturing semiconductor devices and other products of nanotechnologies.

BACKGROUND OF THE INVENTION

Products of nanotechnology, such as semiconductor and other electronic devices, are manufactured on the surface of substrates. Any surface imperfections with dimensions greater than feature sizes of device structures may adversely affect device functionality and lead to device operation failures. Therefore, a great deal of attention in nanotechnologies is paid to preventing contamination and/or damage of the surface of substrates or workpieces, in general meaning. Methods and tools for analyzing surfaces of workpieces found multiple critical applications in nanotechnologies and other areas concerned of surface quality. Prime parameters which differentiate surface analyzers are throughput, sensitivity, defect resolution and cost.

High performance surface analyzers have been developed for inspection of semiconductor wafers. The prime inspection parameters include surface roughness, localized defects, large area defects and scratches. The surface analysis is based on a systematic scanning of a wafer surface with a laser beam. Laser beam radiation scattered on surface imperfections is collected and quantified. Judging on characteristics of the scattered laser radiation, such as intensity of scattered radiation, a nature of surface defects and their dimensions are determined. Also, locations of identified defects are recorded and reported.

A scanning laser beam illuminates an analyzed surface with a beam spot. The throughput of surface analyzers is proportional to the speed of the beam spot movement on the analyzed surface. The "spiral" laser scanning is the most efficient option applied in wafer inspection. It is conventionally implemented with a stationary systems of laser illumination and stationary systems of detection of scattered and, optionally, reflected radiation. A wafer is spun and simultaneously moved along a radial direction so that the laser beam spot on the wafer surface follows a path of an Archimedes spiral. Spiral scanning was first applied for inspecting wafer decades ago (see Altendorfer, H. and Kren, G. "Unpatterned surface inspection for next-generation devices", Solid State Technology. 1996, Vol. 39, Issue 8, pp. 93-96) and since then it became the mainstream approach that has been providing the highest inspection throughput (Tuyen K. Tran "Defect Characterization and Metrology" in Ma, Z. and Seiler, D. G. "Metrology and Diagnostic Techniques for Nanoelectronics", Singapore: Pan Stanford (2017), pp. 592-607).

The concept of spiral scanning is illustrated in FIG. 1. A semiconductor wafer 101 is placed on a rotary table that spins the wafer about its center 104. As an example, the wafer spins in the clockwise direction 106 but any direction of spinning may be applied. A laser beam provided by a stationary source illuminates the wafer 101 with a laser spot. The rotary table is mounted on a linear actuator that moves the rotary table with the wafer 101 in a direction 103 perpendicular to the axis of wafer spinning. An inspection starts with the laser spot located at the center 104 of the wafer 101 and then proceeds until the laser spot on the wafer surface reaches the location 102 at the edge of the wafer 101. The spinning and linear motion of the wafer are synchronized such that the scanning goes track-by-track along the spiral path 105 on the surface of the wafer 101. The boundaries 107 of the scanning tracks correspond to the width of the laser beam spot. Instantaneous laser spots 108 are shown on the last two circles of the spiral path 105. If the distances 109 and 110 between adjacent scanning tracks are not greater than the width of beam spots 108, the entire surface of the wafer 101 is scanned without gaps.

Examples of spiral scanning implementation may be found in U.S. Pat. No. 4,314,763 "Defect detection system" by Steigmeier, et al.; U.S. Pat. No. 6,201,601 "Sample inspection system" by Vaez-Iravani, et al.; U.S. Pat. No. 6,606,153 "Process and assembly for non-destructive surface inspections" by Marxer, et all.; U.S. Pat. No. 7,791,721 "Surface inspection with variable digital filtering" by Takahashi, et al.; U.S. Pat. No. 8,885,158 "Surface scanning inspection system with adjustable scan pitch" by Wolters, et al.; U.S. Pat. No. 8,891,079 "Wafer inspection" by Zhao, et al.; U.S. Pat. No. 8,934,091 "Monitoring incident beam position in a wafer inspection system" by Reich, et al.; U.S. Pat. No. 9,255,891 "Inspection beam shaping for improved detection sensitivity" by Wolters, et al.; U.S. Patent Application No. 20180038803 "Surface Defect Inspection With Large Particle Monitoring And Laser Power Control" by Cui, et al. Wafer analyzers with spiral scanning achieve high throughput through the fast rate of wafer spinning. It is important that the linear motion in spiral scanning is slow and continuous so there are no detrimental impacts of inertia on the accuracy of wafer positioning during surface analysis.

Semiconductor wafers are precisely shaped disks with axial symmetry. However, in practice, the rate of wafer spinning is limited because of inevitable mass imbalances associated with inconsistency of wafer positioning on rotary tables, wafer warpage, etc. Methods and tools for surface analysis with high sensitivity and high resolution apply narrow laser beams. Therefore, scanning an entire wafer surface may only be accomplished with a significant number of spinning revolutions implying a notable time consumption. This major limitation of spiral scanning may become more critical with industry transition to large diameter 450 mm wafers. Several solutions have been developed in the prior art to enhance scanning efficiency of wafer surface analyzers.

For example, U.S. Pat. No. 5,712,701 "Surface inspection system and method of inspecting surface of workpiece" by Clementi, et al. describes a wafer surface analyzer with a system that deflects a laser beam within a narrow scan path of <0.1 radians along the surface of the wafer. In a combination with the conventional spiral scanning, the added component of scanning by high frequency beam deflection enhances wafer inspection throughput. As a drawback, this solution complicates the analyzer, reduces its serviceability and calibration, increased its dimensions and cost of ownership. Besides, the laser beam deflection leads to a change of the angle of laser beam incidence on the wafer surface that may cause some inconsistency in defect detection.

Spiral scanning may be accelerated by adjusting the pitch of scanning during a wafer inspection according to a desired sensitivity to defect detection and throughput—see U.S. Pat. No. 8,885,158 "Surface scanning inspection system with adjustable scan pitch" and U.S. Pat. No. 9,116,132 "Surface scanning inspection system with independently adjustable scan pitch" by Wolters, et al. This approach may not provide throughput benefits when a high resolution surface analysis is required. In overall, there is a need for further improving throughput of wafer surface analyzers.

High throughput surface analyzers with spiral scanning may be effectively applied to inspecting light and axially symmetrical objects such as semiconductor wafers. However, high spinning speed may not be practically implemented for heavy and/or unsymmetrically shaped workpieces. Another drawback of analyzers with spiral scanning is their large dimensions. Rotary tables must have means to firmly hold analyzed workpieces. They also need to be combined with moving stages capable of repositioning a characterized object at distances not less than a half of the lateral dimension of the object. Therefore, surface analyzers with spiral scanning are usually stand-along large tools which have high cost of ownership and cannot be integrated into or within production equipment. Yet another problem of conventional analyzers of technological surfaces is a complexity of their optical systems and unique precision required at their servicing.

The present invention has an objective to provide an analyzer of technological surfaces capable of high precision and resolution and having advantages over the state of the art in (i) attaining higher throughput and efficiency; (ii) analyzing workpieces of arbitrary shapes and mass; (iii) compactness, portability and ability to be integrated into manufacturing or research equipment for in-situ analysis and process or equipment diagnosis; (iv) higher robustness, serviceability and lower cost.

SUMMARY OF THE INVENTION

The present invention discloses an analyzer of technological surfaces that overcomes several limitations and drawbacks of known methods and tools used for surface quality analysis. First, the analyzer provides an enhanced throughput without degrading basic aspects of attaining high resolution and sensitivity to surface features and defects. Second, the design concept of the invented analyzer enables its compact implementation with improved reliability and serviceability at low cost. Next essential differentiation of the analyzer is its capability of inspecting arbitrary large and shaped workpieces and other technological surfaces. Also, due to its small dimensions, the analyzer is compatible with many types of workpiece processing enclosures, such as equipment chambers, and may be integrated into manufacturing equipment for performing in-situ workpiece inspections, monitoring the execution of processes and/or equipment performance. Other beneficial features and capabilities of the analyzer of technological surfaces according to the present invention will be conveyed in the detailed description that follows.

The key advantages of the invented analyzer are achieved partly through a novel concept of assigning, in a special way, the function of scanning motion to optical systems of the analyzer. A solution has been conceived and implemented for high-speed laser beam scanning while ensuring (i) invariable parameters and conditions of scanning (ii) mechanical stability of the analyzer systems and parts, (iii) high accuracy of beam spot positioning, and (iv) a robust optical system. Constant parameters and conditions of scanning such as the angle of laser beam incidence on analyzed surfaces are vital for achieving consistent and quantifiable results of a surface quality analysis.

These and other attributes and benefits of the invention are realized in an analyzer of technological surfaces comprised of a scanner, an electronic control and data processing system and a system that provides a relative motion between the scanner and the analyzed technological surface. The scanner is built with a laser mounted on a hollow shaft. The shaft is spun by a motor and the laser is powered wirelessly. The laser illuminates the object with a beam spot that scans the analyzed surface accordingly to the spinning laser. The scanner also includes an optical system mounted on the shaft. The optical system collects the laser radiation scattered on the analyzed surface and transmits it to a photodetector. Optionally, the laser radiation reflected from the surface may be collected and transmitted to the photodetector. The laser and the spinning optical system are in a fixed mechanical relationship that provides invariable parameters and conditions of scanning and radiation collection. The photodetector is affixed on a stationary frame coaxially with the spinning hollow shaft. The transmission of the collected radiation is implemented through the hollow shaft achieving a mechanical decoupling between the spinning systems and the photodetector. The electronic system controls the laser spinning and the motion of analyzed surface with respect to the scanner. The electronic system registers the intensity of the detected radiation and associates it with instant coordinates of the scanning beam spot on the analyzed surface.

The whole spinning portion of the scanner is implemented in a compact design and may be well balanced allowing high rates of spinning independent on the analyzed objects and surfaces. This capability of high spinning rate of the scanning system provides high throughput and efficiency of a surface analysis using analyzers according to the present invention.

A compact implementation allows an analyzer to be portable into manufacturing machines which process workpieces. Machines of various types contain their own systems for transporting workpieces and moving machine parts. Those transport systems may be utilized for providing slow motions of analyzed surfaces as needed for the surface analysis with apparatus according to the present invention. In this way, additional effects may be achieved in cost saving and reducing the size of surface analyzers.

Further areas of applicability of the present invention will become apparent from the following detailed description, claims and drawings. The detailed description and specific examples are intended for purposes of illustration and are not intended to limit the scope of the invention.

DETAILED DESCRIPTION OF THE INVENTION AND ITS EMBODIMENTS

The following detailed description is merely exemplary in nature and is not intended to limit the invention or applications and uses of the invention. Furthermore, there is no intention to be bound by any expressed or implied theory presented in the preceding field, background and summary of the invention or in the following detailed description. The analyzer of technological surfaces disclosed in the present invention is a complex system comprising numerous components that interact mechanically, optically and electrically in an intricate and coordinated manner. Some of those components and their interactions may not described in detail below because they are conventional and known to those skilled in electronics, mechanics, automation and robotics. Embodiments of the present description provide exemplary solutions and do not intend to limit the scope of the invention—the disclosed analyzer may have numerous specific implementations that follow the concept of the present invention and its claims.

Figure 1:
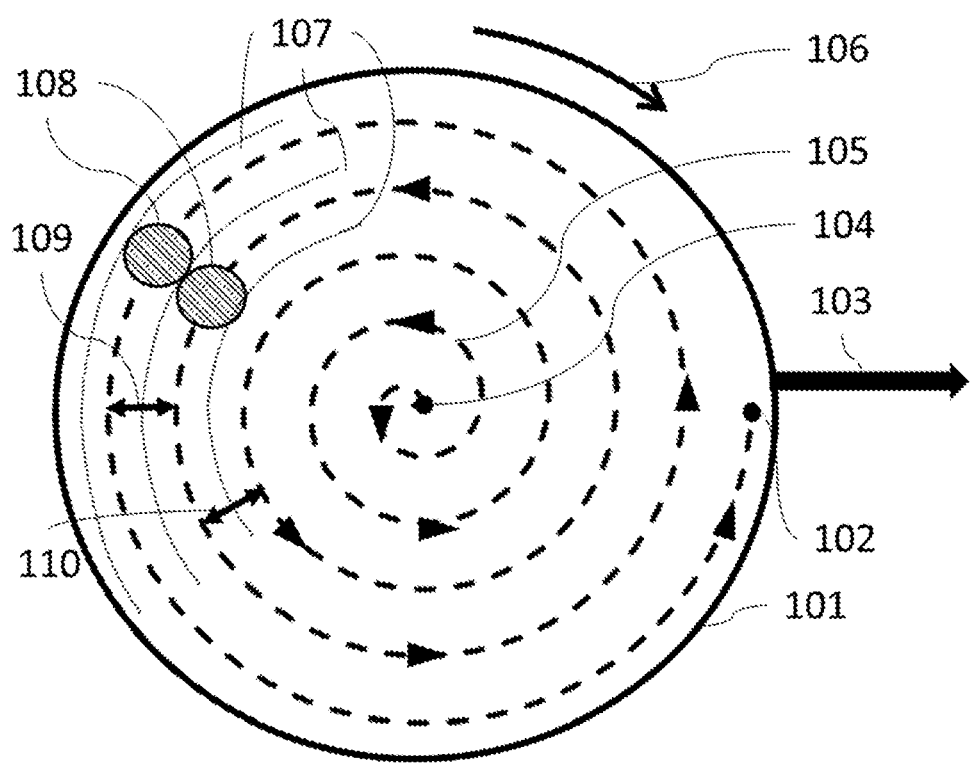
FIG. 1 depicts a conventional spiral scheme of surface scanning.
Figure 2:
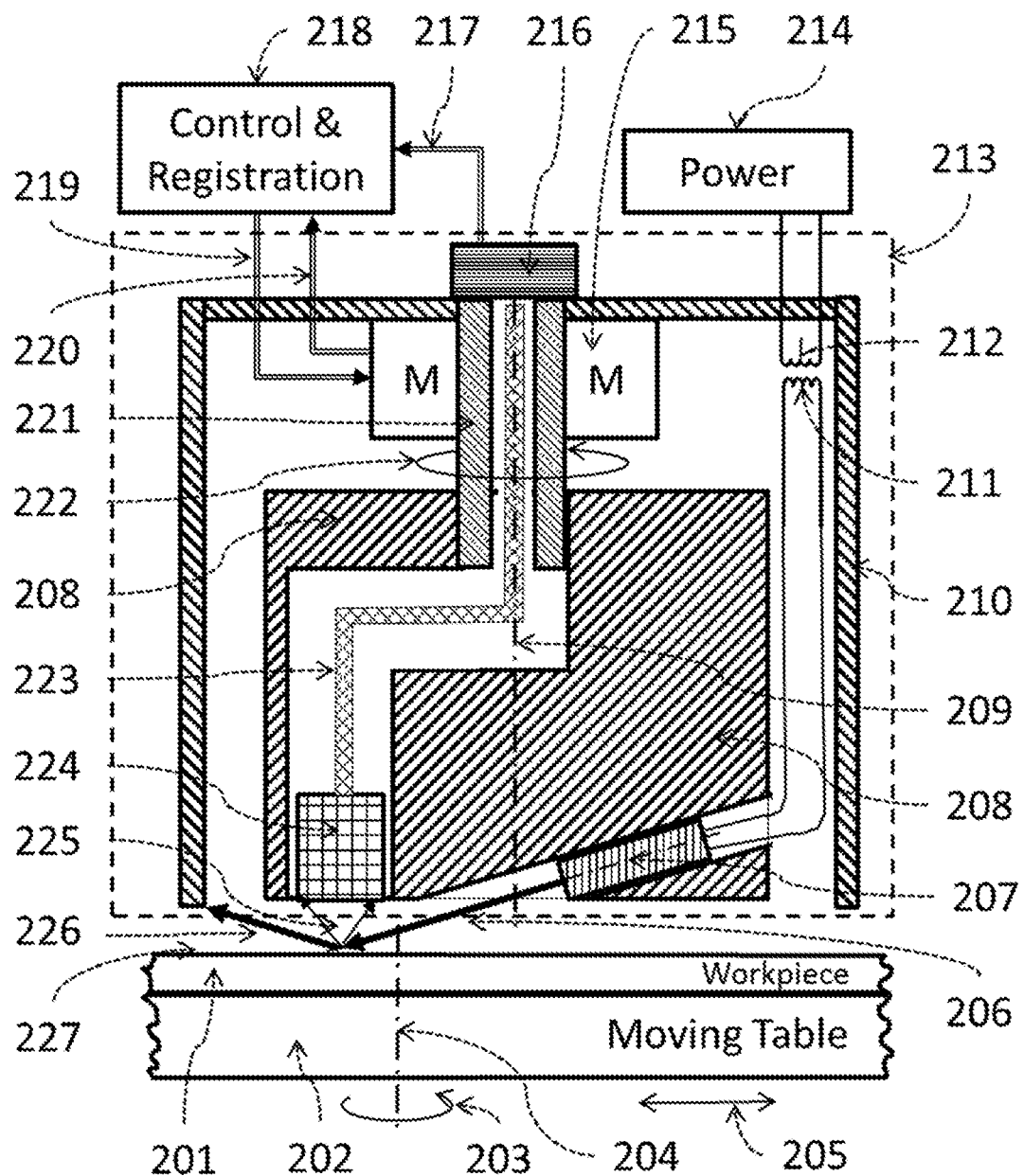
FIG. 2 illustrates key design concepts of analyzers according to the present invention.

A key design concept of analyzers according to the present invention is illustrated in FIG. 2. An analyzer in the shown embodiment includes a scanner 213, a data processing system 218, a power supply unit 214, and a moving table 202. A workpiece 201 is placed on a moving table 202. The workpiece has a flat or near-flat surface 227 representing a portion of the overall workpiece exterior. The surface 227 is illuminated with a laser beam 206 provided by a laser module 207. The laser beam 206 interacts with the surface 227 and sub-surface areas of the workpiece 201 resulting in a reflected beam 226 and scattered laser radiation 225. The reflected beam 226 is terminated by the housing walls 210 of the analyzer. Alternatively, the reflected beam 226 may be terminated with a specially designed damp that may be attached to the beam directing platform 208. Instead of being terminated, the reflected beam 226 may also be measured and the results of those measurements may be used in the analysis. A portion of the scattered radiation 225 is collected by a light collector 224 and then passed by a light transmitter 223 to a photodetector 216 that measures the intensity of the scattered radiation 225. The results of the measurements are conveyed through a communication channel 217 to a data processing system 218.

Referring to FIG. 2, the laser module 207 and the light collector 224 are imbedded in and held by the beam directing platform 208. The beam directing platform 208 is attached to a hollow shaft 221 of a motor 215. The data processing system 218 controls the motor spinning through a communication channel 219. The motor 215 is equipped with an encoder that provides the angular position of the motor shaft revolution to the data processing system 218 through a communication channel 220. The motor 215 spins the hollow shaft 221 and the beam directing platform 208. Accordingly, the laser module 207, the light collector 224 and the light transmitter 223 are set in spinning motion 222 about the spin axis 209. The light transmitter 223 is deployed within the beam directing platform 208 facing, on one end, the light collector 224 and, on the other end, exiting towards the photon counter 216 through the hole in the motor shaft 221. The laser module 207 is wirelessly powered by a power supply unit 214 through inductive coupling comprised of a supplying induction coil 212 and a receiving induction coil 211, the coils form an electrical transformer. Stationary components of the scanner 213 include the analyzer housing 210, the motor 215 and the photodetector 216. The spinning components of the scanner 213 include the motor shaft 221, the beam directing platform 208 and the laser module 207, the receiving induction coil 211, the light collector 224 and the light transmitter 223.

Still referring to FIG. 2, the moving table 202 that may perform a controllable linear motion 205 perpendicular to the spin axis 209. Instead of or in addition to a linear motion, the moving table 202 may perform a rotational motion 203 about an axis 204 parallel to the spin axis 209. It is essential that motions 205 and 203 are slow and, in particular, much slower compared to the spinning motion 222 of the beam directing platform 208 as will be explained below. The role of the moving table 202 is to reposition the workpiece 201 with respect to the scanner 213 in a controllable or predetermined way. Such repositioning may be achieved by moving the scanner while keeping a workpiece stationary.

In applications where moving a workpiece is undesirable or impossible, it is preferred to attach the scanner of the analyzer to a linear or/and a rotary actuator and move it with respect to a stationary workpiece. The design concept of an analyzer according to the present invention allows the scanner to be implemented in compact forms and secure the mechanical stability of its components. Therefore, a slow and steady motion of the scanner does not raise any challenges or concerns. The term "platform" in describing the beam directing platform in the present invention denotes any means or fixtures, such as rods, bars, disks and fasteners which can be used to arrange a laser module, a light collector and a light transmitted in a fixed relationship with a spinning shaft of the scanner.

Figure 3:
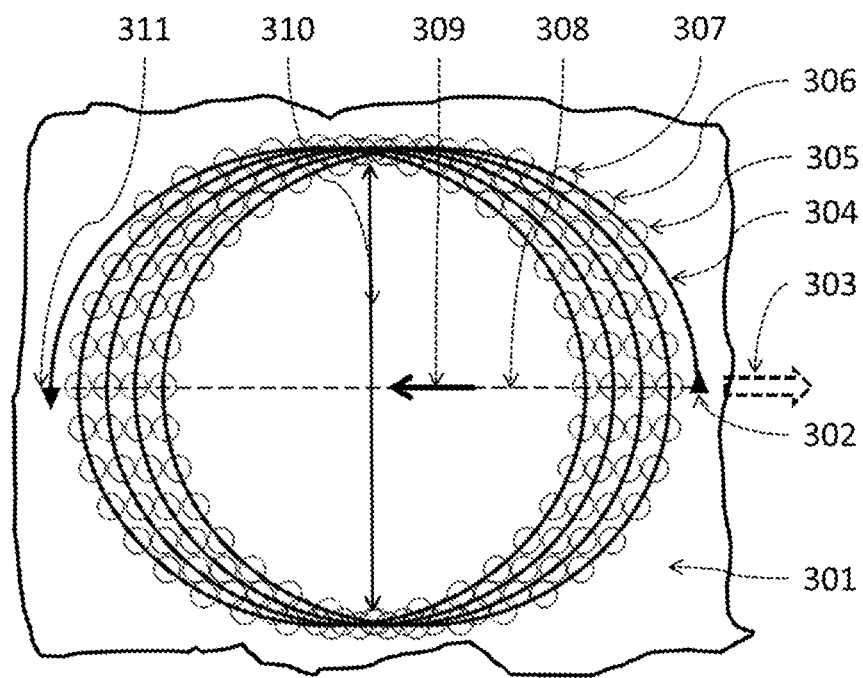
FIG. 3 illustrates a pattern of surface scanning by an analyzer according to the present invention in case of linear relative movement between an analyzed surface and a scanner head.

To illustrate a pattern of surface scanning with an analyzer according to the present invention in case of a linear relative movement between a workpiece and a scanner, FIG. 3 depicts a top view of a workpiece with a surface 301. A beam directing platform in a scanner, not shown, spins counter-clockwise in this embodiment. The spin axis is perpendicular to the surface 301. The workpiece is moved with respect to the scanner in a direction 303 or, equivalently, the analyzer is moved with respect to the workpiece in the direction 309 opposite to the direction 303. A spin axis of the beam directing platform is initially positioned on a line 308 and moves along the line 308 in the direction 309. A laser module initially illuminates the surface 301 with a beam spot at the position 302. As the beam directing platform spins, the beam spot follows a circular path 304 taking further instantaneous locations such as positions 305, 306, 307, and so on. The beam spot position 311 is the last shown. Due to the relative motion of the scanner with respect to the workpiece, the scanning circles continuously shift in the direction 309. It is preferred that the relative motion of the analyzer with respect to the workpiece is coordinated with the spinning rate of the beam directing platform so that every other revolution of the platform corresponds to a relatively short shift of along the linear direction 309. In other words, the linear motion is much slower compared to spinning motion of the beam directing platform. In the result, the beam spot scans a relatively broad surface band of a width 310 along the direction 309 of linear movement.

The only fast motion in the entire setup of the surface analysis is spinning of the beam directing platform. Its spinning rate is independent of the analyzed workpiece. The platform is compact and may be well balanced to avoid any vibrations even at a very high spinning rate. The throughput of a workpiece analysis is proportional to the spinning rate of the beam directing platform. Therefore, an analyzer according to the present invention may achieve a very high efficiency and throughput at analyzing arbitrary workpieces and other technological surfaces.

Figure 4:
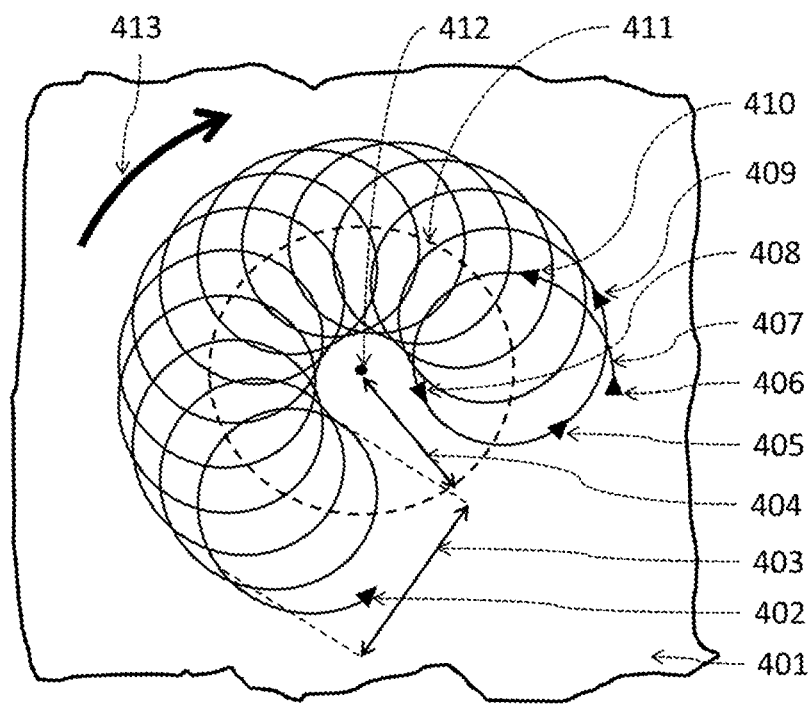
FIG. 4 illustrates a pattern of surface scanning by an analyzer according to the present invention in case of relative rotational movement between an analyzed surface and a scanner head.

FIG. 4 illustrates a pattern of surface scanning by an analyzer according to the present invention when a rotational motion is applied to provide a relative movement between a workpiece and a scanner. In this embodiment, a beam directing platform in a stationary scanner head, not shown, spins counterclockwise about a spin axis arranged perpendicular to the analyzed technological surface 401. The surface is set in a rotational motion 413, clockwise in this example, about a rotation axis 412 oriented perpendicular to the surface 401. For implementing surface scanning, the spin axis of the beam directing platform and the rotation axis 412 need to be apart. A spin axis of the beam directing platform is positioned at a distance 404 from the rotation axis 412. A laser module initially illuminates the surface 401 with a beam spot at a position 406. As the beam directing platform spins, the beam spot follows a circular path 407 with some instantaneous locations such as positions 410, 408, 405, 409, and so on. The beam spot position 402 is the last shown on the path 407. Due to the rotational motion 413, the spin axis of the beam directing platform follows a path along a circle 411 about the rotation axis 412 in a direction opposite to the rotational motion 413. The radius of the circle 411 equals the distance 404. In the result, the beam spot scans the surface 401 through a relatively broad ring having the width 403.

Still referring to FIG. 4, the scanning circles along the beam spot path 407 shift counterclockwise with every spinning revolution of the beam directing platform. It is preferred that the rotational motion of the technological surface 401 is coordinated with the rate at which the beam directing platform spins. Every other revolution of the spinning platform should preferably correspond to a relatively small angle of surface rotation. It is obvious that the rotational motion of the surface is much slower compared to the spinning motion of the beam directing platform. Similar to the case of linear motion of an analyzed surface with respect to a scanner, spinning of the beam directing platform is the only fast motion required for the analysis. The spinning rate is independent of the analyzed workpiece. This is a trivial task to provide a high balance for the platform in order to avoid vibrations at a high spinning rate. The throughput of the surface analysis is proportional to the spinning rate of the beam directing platform. Therefore, an analyzer according to the present invention may achieve a very high efficiency and throughput of analyzing arbitrary workpieces and other technological surfaces. Optionally, the rotational motion 413 of the analyzed surface 401 may be substituted by a motion of the scanner along the circle 411 that would provide the equivalent repositioning of an analyzed workpiece and its surface 401 with respect to the scanner.

Figure 5:
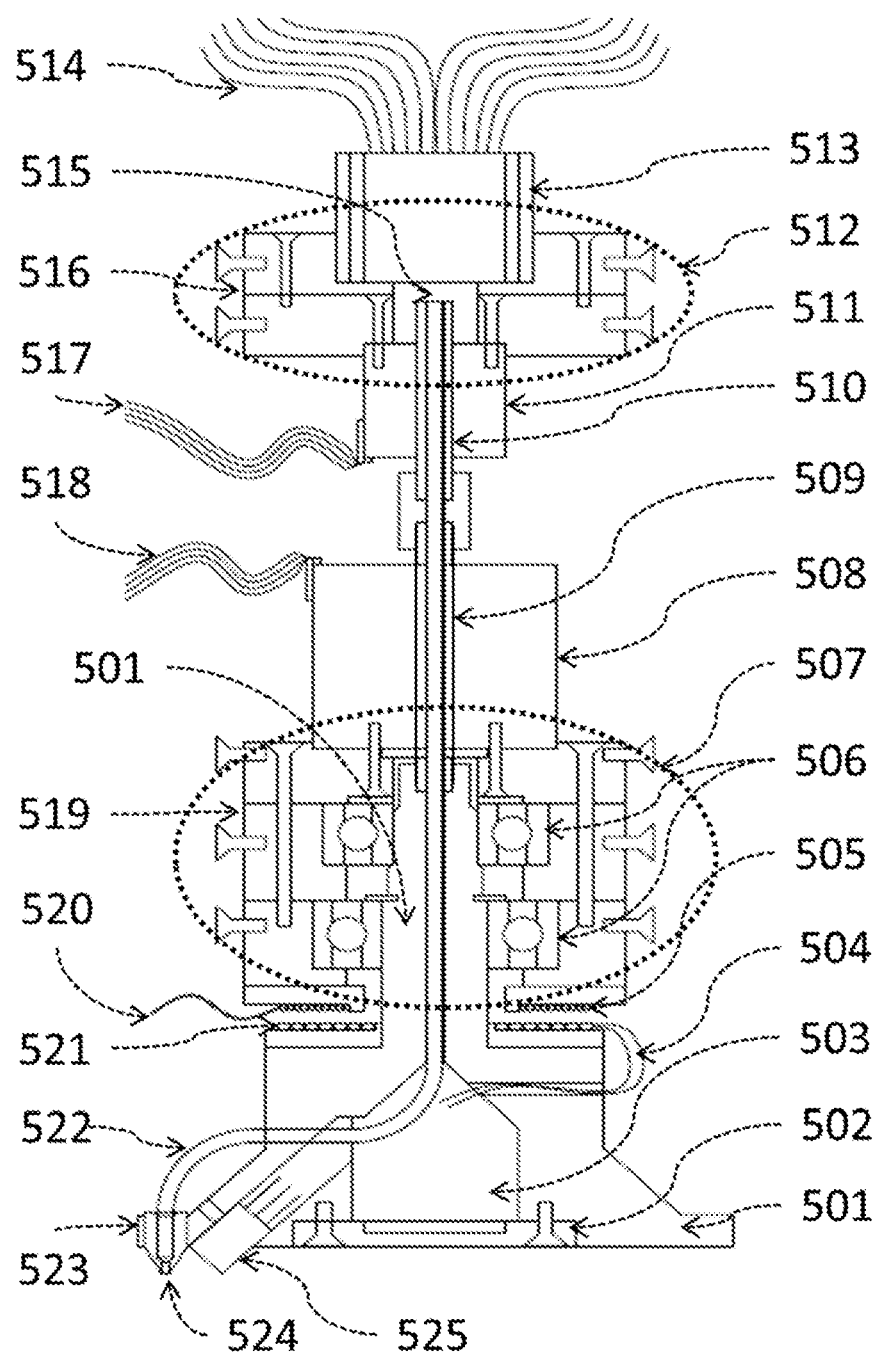
FIG. 5 depicts an embodiment of a practical implementation of an analyzer according to the present invention.

FIG. 5 illustrates an embodiment of an analyzer according to the present invention. The beam directing platform 501 is held by bearings 506 in the socket assembly 507 that is affixed at its sidewalls 519 to housing walls, not shown, of the analyzer. The step motor 508 with its hollow shaft 509 is mounted on the socket assembly 507. The beam directing platform 501 is affixed to the hollow shaft 509. The rotary encoder 511 is attached to the joint assembly 512 that is affixed at its sidewalls 516 to the housing walls of the scanner, not shown. The rotary encoder 511 has the encoder hollow shaft 510 that is coupled with the motor hollow shaft 509. In this way, the housing of the scanner arranges in a fixed relationship the socket assembly 507, the step motor 508, the rotary encoder 511 and the joint assembly 512. The motor hollow shaft 509 spins the encoder hollow shaft 510 and the beam directing platform 501.

Referring to FIG. 5, the laser module 525 is wirelessly powered from an external power supply unit, not shown, through a transmitting induction coil 505 and a receiving induction coil 521. The transmitting induction coil 505 is attached to the stationary socket assembly 507 and electrically connected to an external power supply unit through wires 520. The receiving induction coil 521 is attached to the beam directing platform that may spin. It powers the laser module 525 through wires 504. There is an empty space 503 made in the beam directing platform 501 to accommodate a power adapter, not shown, used for modifying the power supply voltage provided by the receiving induction coil 521 to a voltage required for powering the laser module 525. The cap 502 covers the space 503 and it may be removed for servicing the power adapter.

Still referring to FIG. 5, the laser module 525 illuminates a technological surface intended for an analysis. A holder 523 grasps a bottom end of the optical fiber cable 522. The bottom end face 524 of the cable 522 collects a portion of a laser radiation scattered on the analyzed surface. The optical fiber cable 522 is embedded into the spinning components of the scanner. It is routed through the beam directing platform 501, motor hollow shaft 509, encoder hollow shaft 510 and the joint assembly 512 towards the photomultiplier tube 513 (PMT) held by the joint assembly 512. From the top end face 515 of the optical fiber cable 522, the photomultiplier tube 513 receives and measures the transmitted scattered radiation in terms of a current or a voltage that is correlated to the intensity of the scattered radiation. The measured values of the scattered radiation are communicated through PMT wires 514 to a computer, i.e. a data processing system, not shown. Through wires 518, the step motor 508 is powered and connected to the computer that controls its spinning rate. The rotary encoder 511 measures angular positions of the bottom end face 524 of the optical fiber cable 522 with respect to the axis of its spinning. The angular positions are continuously communicated to the computer through wires 517. In the process of a surface analysis, the computer also receives the data on the continuously changing position of the scanner with respect to an analyzed workpiece, not shown. These data combined with the data on angular positions of the spinning bottom end face 524 of the optical fiber cable 522 are sufficient to associate every momentarily value of the scattered radiation with the coordinates of the localized area on the technological surface from which the scattered radiation is received.

Figure 6:
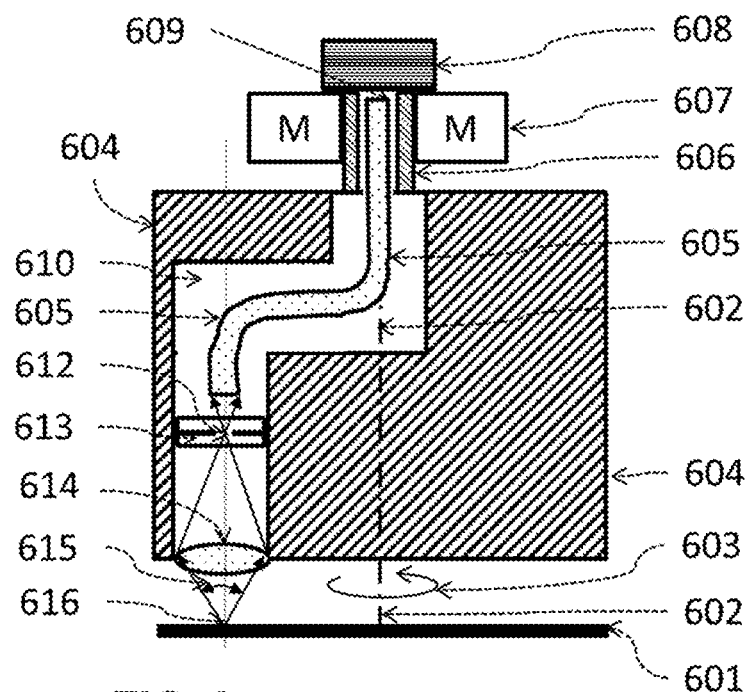
FIG. 6 illustrates an embodiment of an analyzer design, according to the present invention, that utilizes an optical lens for collecting laser radiation scattered at a technological surface and an optical fiber cable for conveying collected radiation to a photodetector.

The sensitivity of an analyzer of technological surfaces according to the present invention is proportional to the collected portion of the scattered radiation. In the embodiment illustrated in FIG. 5, it is limited with the aperture of the optical fiber. FIG. 6 shows an embodiment of an analyzer according to the present invention that uses an optical lens for collecting the laser radiation scattered on an analyzed surface. The optical lenses may have a diameter significantly greater than the diameter of an optical fiber cable. This increases the effective aperture of collection of scattered radiation and improves the analyzer sensitivity. A workpiece surface 601 is illuminated at a spot 616 by a laser module, not shown. The laser module is held by the beam directing platform 604 mounted on the hollow shaft 606 of the motor 607 that spins the beam directing platform 604 in a direction 603 about the spin axis 602. In the beam directing platform 604, a passage 610 is made for accommodating optical components of the analyzer including the lens 614, the aperture 613, and the optical fiber cable 605. The optical lens 614 is mounted at the bottom of the beam directing platform 604 such that it faces the beam spot 616. Preferably, the optical axis of the lens 614 intersects the middle of the beam spot 616. The optical lens 614 collects the laser radiation scattered on the surface 601. A portion of the scattered radiation is collected within the solid angle 615 that is notably larger compared to the angle of radiation collected by a bottom end face of an optical fiber cable as discussed in the previous embodiment with the reference to FIG. 5. As a results, an improved analyzer sensitivity is achieved.

Still referring to FIG. 6, the collected portion of radiation scattered at the beam spot 616 is focused by the lens 614 at the point 612. In terms of optical engineering, the point 612 is an image of the beam spot on the analyzed surface, it is located in a geometric plane that is the conjugate focal plane of the analyzed surface. It is preferred to have a pinhole aperture 613 installed at the point 612. The role of the aperture is to increase a signal-to noise ratio by shading or damping parasitic background radiation, i.e. the rays of light generated outside of the beam spot 616. Therefore, the diameter of the pinhole may be the same or close to the diameter of the laser beam. In this way, the pinhole aperture 613 improves the resolution of the analyzer. The optical fiber cable 605 receives the collected scattered radiation passed through the pinhole aperture 613 and transmits it to the photodetector 608. The concept of measuring and registering the scattered radiation synchronously with the instantaneous coordinates of the laser beam spot on the analyzed surface is the same as in the previous embodiment discussed with the reference to FIG. 5.

Using optical fibers for transmitting a collected position of scattered radiation is a robust option in analyzers according to the present invention. However, it may expected that a notable quantity of scattered radiation can be lost at transmission because of the light scattering and absorption in the bulk of a fiber as well as scattering on the surfaces of fiber end faces. Besides, an optical fiber has a limited acceptance angle, i.e. the maximum incidence angle at which light can be guided through the fiber. Some of the rays of scattered radiation focused at the point 612, see FIG. 6, may have angles of deviation from the optical axis of the lens 614 greater than an acceptance angle of the optical fiber cable 605. Those rays may not be transmitted. For applications requiring especially high sensitivity to surface features, it may be preferred to use mirrors to transmit the scattered radiation to the photodetector.

Figure 7:
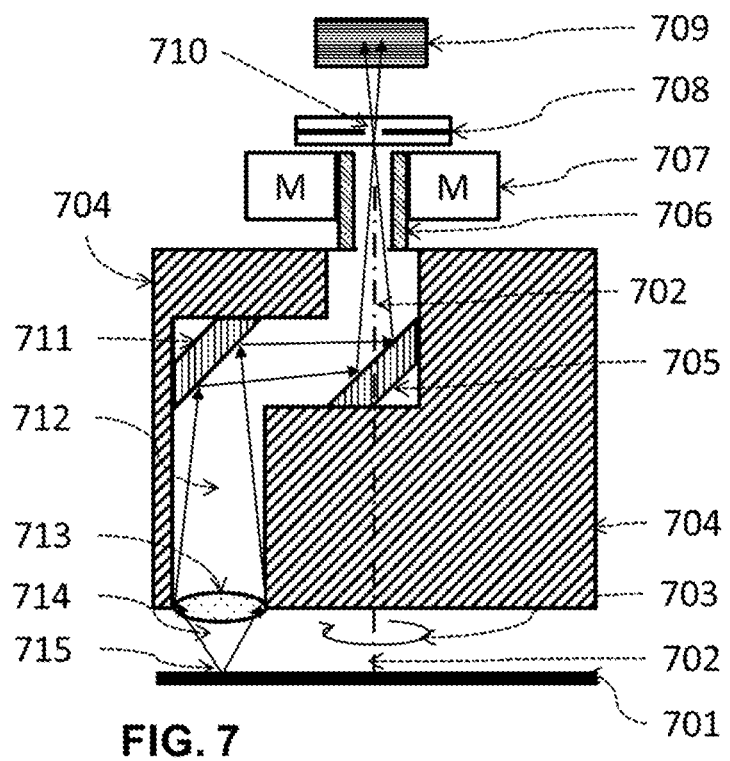
FIG. 7 illustrates an embodiment of an analyzer design according to the present invention that utilizes an optical lens for collecting laser radiation scattered at a technological surface and a system of flat mirrors for conveying collected radiation to a photodetector.

FIG. 7 illustrates an embodiment of an analyzer with a system of mirrors transmitting the collected portion of scattered radiation to a photodetector. A workpiece surface 701 is illuminated at the spot 715 by a laser module, not shown. The laser beam scatters at the surface features intended for the analysis and generates rays of scattered radiation 714. The laser module is held by the beam directing platform 704 mounted on the hollow shaft 706 of the motor 707. The motor spins the beam directing platform 704 in a direction 703 about the spin axis 702. The passage 712 is made in the beam directing platform 704 to accommodate optical components of the analyzer including the lens 713, the first mirror 711 and the second mirror 705. The optical lens 713 is mounted at the bottom of the beam directing platform 704 such that it faces the beam spot 715. Preferably, the optical axis of the lens 713 intersects the middle of the laser beam spot 715. The rays of scattered radiation 714 are collected by the optical lens 713 and directed to the first mirror 711. The first mirror 711 reflects the rays towards the motor hollow shaft 706 where the rays are reflected by the second mirror 705 along the spin axis 702, i.e. the axis of the hollow shaft 706, towards the photodetector 709. Consequently, the scattered radiation emitted from a moving, i.e. spinning, beam spot on the analyzed surface 701 is consistently conveyed to the photodetector 709 that is a stationary component of the scanner. The collected rays of radiation 714 are preferably focused at a point 710 before they reach the photon counter 709. The aperture 708 installed at the point 710 is recommended for cutting off parasitic rays undesirably collected from surface areas outside of the beam spot 715. In this way, the resolution of an analysis may be further improved. The diameter of the aperture 710 may be of the same order of magnitude as the width of the laser beam. An optical system based on reflecting mirrors, as shows in FIG. 7, may provide lesser losses and, therefore, better efficiency of scattered light transmission to the photon detector. In the result, the analyzer of technological surfaces will have higher sensitivity and detectability of surface features which scatter laser radiation. The mirrors 711 and 705 in the illustrated embodiment are flat. Alternatively, mirrors of an optical transmitter of an analyzer according to the present invention may be curved, e.g. concave or convex, and used for proper focusing the collected rays of scattered radiation.

Figure 8:
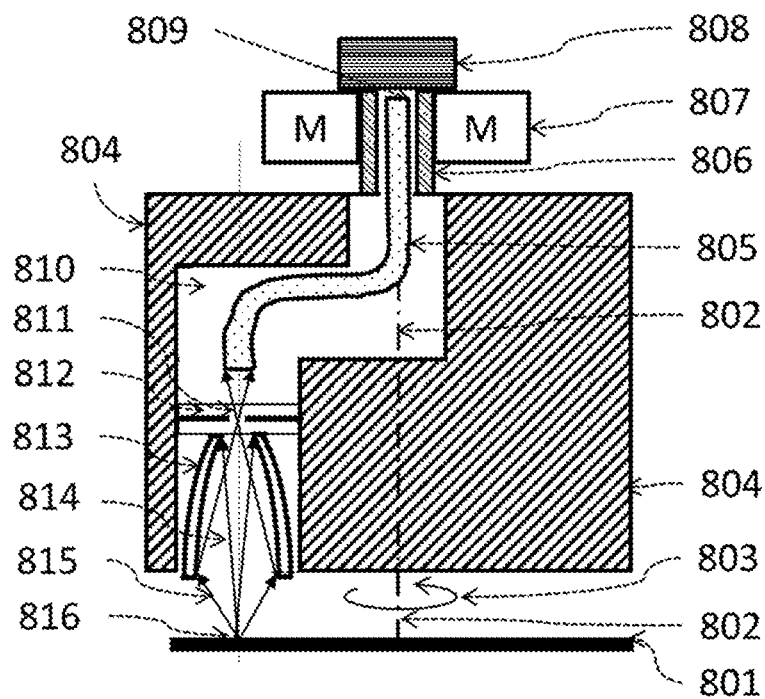
FIG. 8 illustrates an embodiment of an analyzer design according to the present invention that utilizes an ellipsoidal mirror for collecting laser radiation scattered at a technological surface and an optical fiber cable for conveying collected radiation to a photodetector.

A numerical aperture and an acceptance angle of ellipsoidal or parabolic mirrors of a rotational form may be higher and aberrations may be lower compared to optical lenses. Therefore, the sensitivity and resolution of an analyzer according to the present invention may be further enhanced by using such mirrors for collecting radiation scattered an analyzed technological surface. A related embodiment of an analyzer is illustrated in FIG. 8. A technological surface 801 is illuminated at the spot 816 by a laser module, not shown. The laser module is incorporated into the beam directing platform 804 that is mounted on the hollow shaft 806 of the motor 807. The motor 807 spins the beam directing platform 804 in a direction 803 about the axis 802. A hollow passage 810 is made within the beam directing platform 804 for mounting optical components including the ellipsoidal mirror 813, the aperture 812, and the optical fiber cable 805. The ellipsoidal mirror 813 is mounted at the bottom of the beam directing platform 804 such that its first (lower) focus is positioned at the laser beam spot 816. The aperture 812 is installed at the second (upper) focus 811 of the ellipsoidal mirror 813. The ellipsoidal mirror 813 collects the laser radiation scattered at the surface 801. The collected scattered radiation is directed through the aperture 812 onto the bottom end face of the optical fiber cable 805. The cable 805 guides the scattered radiation to its top end face 809 where the radiation is received by the photodetector 808. The aperture 812 blocks background light and increases the signal-to noise ratio of the analyzer. The solid angle 815 of scattered light collection may be greater than in case of using a lens. Therefore, a greater portion of the scattered radiation may be collected and better sensitivity and resolution of the analyzer may be achieved. In general, high efficiency of radiation collection may also be achieved with parabolic and other curved mirrors which provide large apertures.

Figure 9:
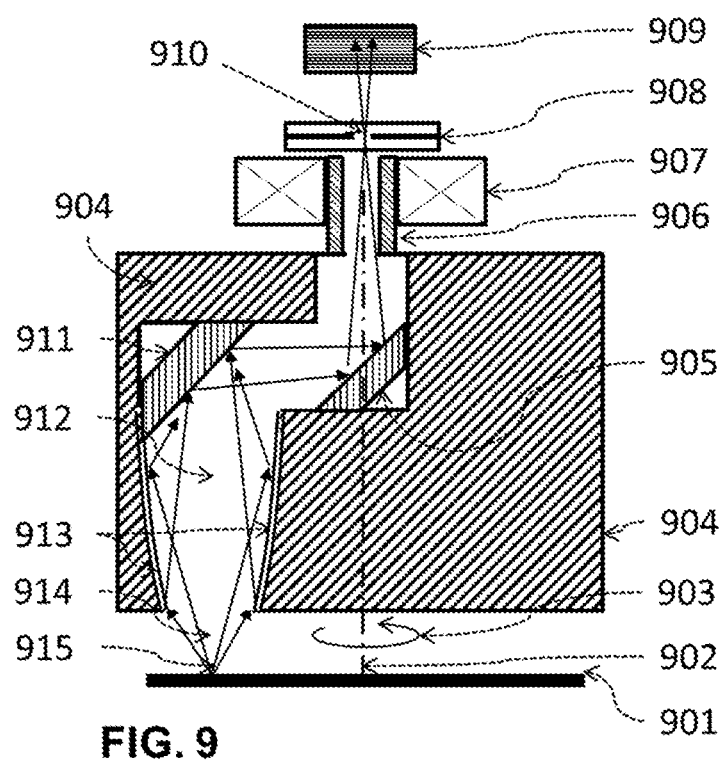
FIG. 9 illustrates an embodiment of an analyzer design according to the present invention that utilizes an ellipsoidal mirror for collecting laser radiation scattered at a technological surface and a system of flat mirrors for conveying collected radiation to a photodetector.

FIG. 9 illustrates an embodiment of an analyzer in which a collected portion of a scattered radiation is transmitted to a photodetector by a system of mirrors. Reduced optical losses and a higher efficiency of light transfer may be achieved in this case leading to better sensitivity and resolution of surface features. A workpiece surface 901 is illuminated by a laser module, not shown, at the laser beam spot 915. The laser beam reflects and scatters at the surface features resulting in a scattered radiation 914. The laser module is imbedded into the beam directing platform 904 mounted on the hollow shaft 906 of the motor 907. The motor 907 spins the beam directing platform 904 in a direction 903 about the spin axis 902. The beam directing platform 904 has the hollow passage 912 where optical components of the analyzer are mounted. Those include the ellipsoidal mirror 913, the first flat mirror 911 and the second flat mirror 905. The ellipsoidal mirror 913 is positioned at the bottom of the beam directing platform 904 such that its first focus coincides with the beam spot 915, preferably with its center. A portion of scattered radiation 914 is collected by the ellipsoidal mirror 913 that reflects it along the passage 912. In the result of reflections at the first mirror 911 and then at the second mirror 905, the rays of scattered radiation are directed through the hollow shaft 906 towards the photodetector 909. The ellipsoidal mirror 913 is chosen to have the second focus at a point 910 in front of the photodetector 909. An aperture 908 may be positioned at the point 910 to block unrelated light from reaching the photodetector 909 and improve the signal-to noise ratio in the scattered radiation detection and measurement. The size of the aperture is selected depending of a specific application and types of analyzed surfaces such that a required sensitivity and resolution of surface features may be achieved.

Figure 10:
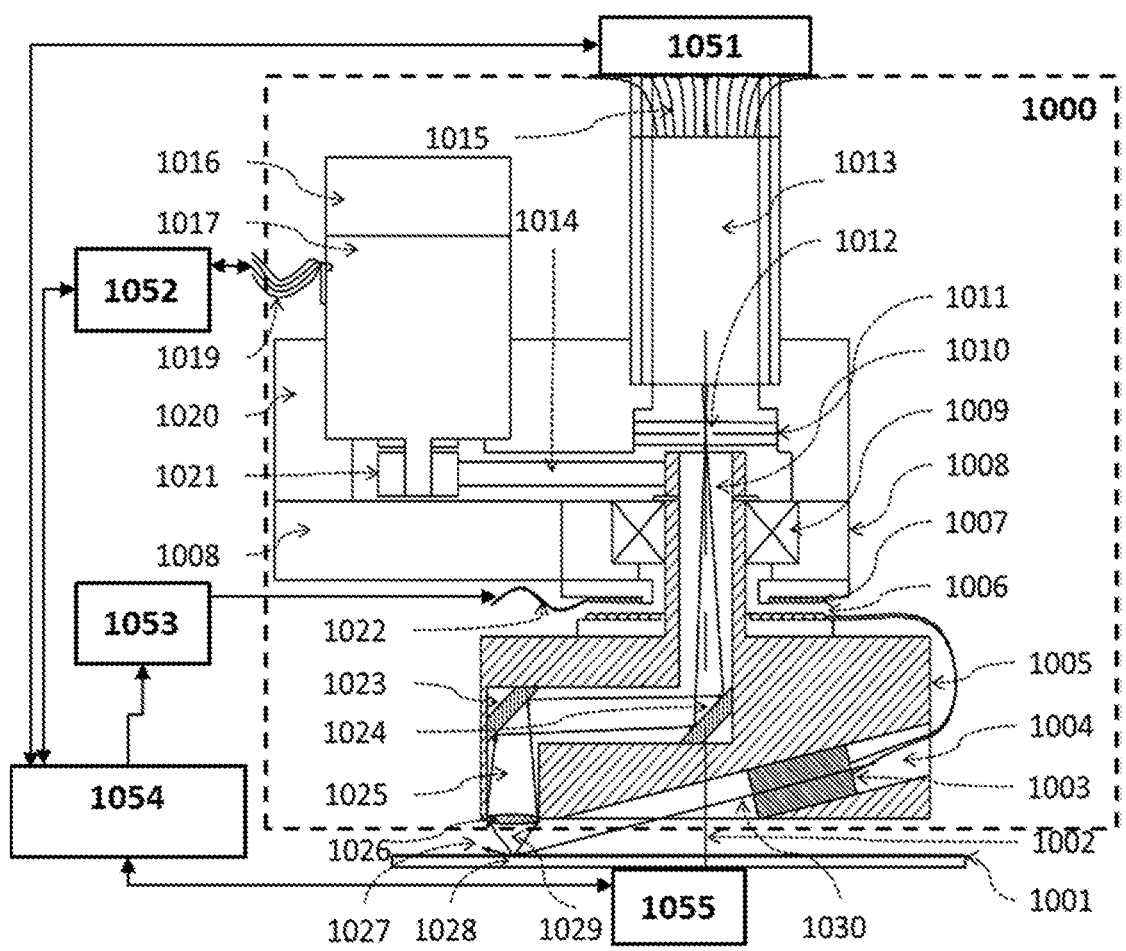
FIG. 10 depicts an embodiment of a practical implementation of an analyzer according to the present invention.

FIG. 10 shows an embodiment of a specific implementation of an analyzer according to the present invention. The analyzer comprises the scanner 1000, the moving table 1055 for repositioning a workpiece 1001, the power supply and measurement module 1051 for PMT 1013 (photomultiplier tube), the power supply and controller module 1052 for the servomotor 1017 equipped with the encoder 1016, the power supply module 1053 for powering the laser module 1003 through the supplying, i.e. transmitting, induction coil 1007 and the receiving induction coil 1006, and a computer system 1054 that executes recipes and registers the result of an intended analysis.

Referring to FIG. 10, the scanner 1000 comprises a mounting plate 1008 with embedded bearings 1009 holding the hollow shaft 1005 that may spin about the spin axis 1002 perpendicular to the surface of the analyzed workpiece 1001. The axial bore 1010 in the shaft 1005 is extended off the spin axis 1002 with a passage 1025 exiting the shaft 1005 at a distance from the axis 1002 and facing the surface of the analyzed workpiece 1001. The lens 1026, the first mirror 1023 and the second mirror 1024 are fixed in the passage 1025 and the axial hole 1011 of the hollow shaft 1005. The supplying induction coil 1007 is attached to the bottom of the mounting plate 1008 around the shaft 1005 and connected to the power supply module 1053 with wires 1022. The receiving induction coil 1006 is attached to the top horizontal surface of the shaft 1005 in front of the supplying induction coil 1007. The servomotor 1017 with the encoder 1016 is installed on the holder 1020 that is mounted on the top of the mounting plate 1008. The axis of motor rotation is parallel to the spin axis 1002. The belt 1014 links the motor shaft 1021 and the hollow shaft 1005. The motor 1017 spins the shaft 1005 through the belt 1014. The pinhole aperture 1011 and the PMT 1013 are installed on the holder 1020 above the bore 1010 in the hollow shaft such that they are aligned axially with the spin axis 1002. The laser module 1003 is embedded into the shaft 1005 such that its axis and the laser beam 1030 intersect the optical axis of the lens 1026 on the surface of the analyzed workpiece 1001.

Experiments showed that the best detectability of nanoscale features on characterized surfaces may be achieved at angles of incidence of the laser beam on an analyzed surface in the range of 45-85 degrees.

Next, an embodiment of operation of the analyzer shown in FIG. 10 is described. A recipe for an intended analysis is stored in the computer system 1054. As soon as the recipe is launched for execution, the computer system initiates the surface analysis with the following instructions specified in the recipe:

(i) for the power supply and controller module 1052—to start spinning the servo motor 1017 and the shaft 1005 at a specific rate;

(ii) for the power supply module 1053—to turn on the laser module 1003;

(iii) for the power supply and measurement module 1051—to power PMT 1013 and start measurements.

(iv) for the moving table 1055—to start repositioning the analyzed workpiece 1001 along a specific path with a specific speed;

The surface of the workpiece 1001 is illuminated by the laser module 1003 at the spot 1028. A portion 1027 of laser radiation is reflected from the analyzed surface and leaves the scanner. Another portion of the laser radiation is scattered by surface features resulting in a scattered radiation. Rays 1029 of the scattered radiation are collected by the optical lens 1026 that focuses them at the point 1012 in front of PMT 1013. Before reaching that point, the rays directed along the passage 1025 reflect at the first mirror 1023 towards the spin axis 1002 and then reflect at the second mirror 1024 that directs them through the bore 1010 in the hollow shaft 1005. The aperture 1011 filters the scattered radiation from parasitic and background light and admits the filtered radiation to PMT 1013. The PMT measures the intensity of the scattered radiation.

Immediately after the initiation of the analysis, and then continuously during the execution of the analysis, the computer system 1054 receives:

(i) the feedback on the rotation angle (a) of the servomotor—from the encoder 1016 through wires 1019;

(ii) the feedback from the moving table 1055 on the distances ($D_X$, $D_Y$) of workpiece repositioning with respect to the scanner 1000.

Figure 11:
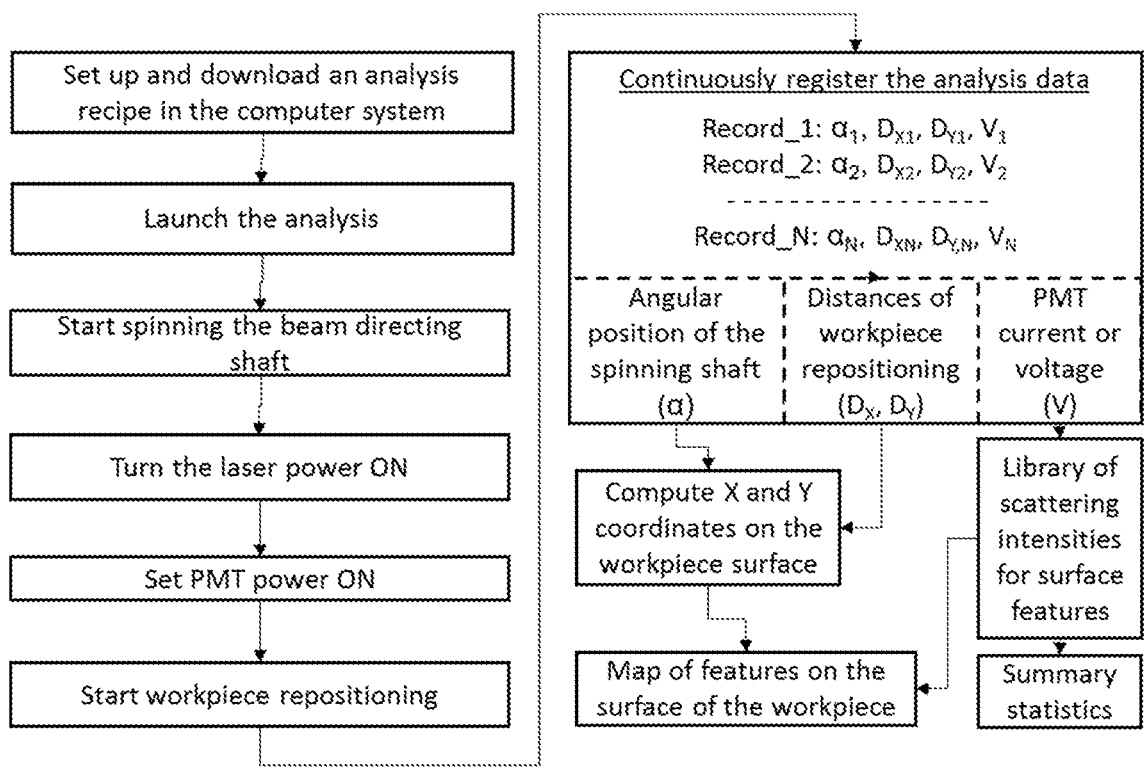
FIG. 11 depicts an embodiment of a block diagram showing a sequence of analyzer operations during an analysis of a technological surface.

(iii) the intensity values (V) of scattered radiation—from the PMT power supply and measurement module 1051 through wires 1015;

All these inputs are synchronously registered. In the result, the data on localized scattering of the laser beam at the surface of the workpiece are obtained. Further, the intensity of scattered radiation may be associated with surface features of interest, such as the size and type of surface defects or surface roughness. Using the registered data on rotation angle ($\alpha$) and distances ($D_X$, $D_Y$) of workpiece repositioning, the computer system calculates instantaneous coordinates (X, Y) of the laser beam spot on the analyzed surface. Finally, coordinates of every detected surface feature are determined and reported as a summary statistics. A map of feature locations on the workpiece surface may be built. The flowchart of the analysis is presented in FIG. 11.

Providing an in-situ inspection of manufactured workpieces is highly beneficial for controlling production processes, ensuring quality of products, enhancing manufacturing productivity and reducing production cost. A capability of production equipment to conduct a self-diagnostics and call for maintenance accordingly is highly valuable for reducing production scrap, repair downtime and enhancing the overall equipment efficiency. A significant amount of quality parameters and causes of equipment malfunction correlates to degradation of workpiece and equipment surfaces. Therefore, this is desirable to integrate capabilities of surface analysis with the manufacturing equipment. As it follows from the previous description, the design of analyzers according to the present invention enables analyzer implementation in uniquely compact forms which are portable into equipment units. In particular, this solution may be highly valuable for semiconductor equipment used in semiconductor wafer and reticle processing because wafer and reticle surface contamination, such as particles, or damage, such as scratches, are the major cause of yield losses in semiconductor device production. In a preferred embodiment, a diagnostics of equipment may be conducted based on inspection of processed workpieces. In another preferred embodiment, this may be advantageous to inspect test or witness workpieces with a known original surface quality. To ensure the relevance of the results of a surface analysis, a test workpiece may preferably be exposed to the same minienvironment and may preferably be periodically transported along the same paths within equipment as that used for processing workpieces.

The analyzer of technological surfaces disclosed in the present invention is a complex system comprising many components that interact mechanically, optically and electrically in an intricate and coordinated manner. Some of those components are conventional and are not explained in detail in the present description because they have various appropriate and readily available solutions and related products on the market. For those skilled in electronics, automation or robotics, this would be a standard task to select and integrate controlling, communicating and recording components according to the functions described in the present invention. For those skilled in the field of mechanical engineering, this is a trivial task to select or manufacture mechanical and optical components, assemble them into an apparatus according to the present invention and achieve the benefits of the present invention. Numerous specific implementations of the disclosed apparatus may exist. Examples given the present description provide particular solutions and do not intend to limit the scope of the invention.

What is claimed is:

1. An analyzer of technological surfaces, the analyzer including:
   a scanner;
   an electronic control and data processing system,
   and a transport system providing a relative motion between the scanner and an analyzed technological surface;
   wherein the scanner comprises:
   i. a hollow shaft with a bore, the hollow shaft is configured for spinning about a spin axis perpendicular to an analyzed technological surface;
   ii. a motor configured to drive the spinning of the hollow shaft;
   iii. a laser module affixed to the hollow shaft and directed to illuminate an analyzed technological surface with a laser beam spot at a distance from the spin axis;
   iv. a power transmitter wirelessly powering the laser module;
   v. a photodetector mechanically decoupled from the hollow shaft, an entry window of the photodetector is centered about the spin axis and oriented to face the bore in the hollow shaft;
   vi. a radiation collector affixed to the hollow shaft and configured to collect laser radiation scattered at the laser beam spot on an analyzed technological surface;
   vii. and an optical transmitter conveying a collected portion of the scattered laser radiation from the radiation collector to the photodetector through the bore in the hollow shaft.

2. The analyzer of technological surfaces of claim 1 wherein
   the power transmitter wirelessly powers the laser module using an inductive coupling between a transmitting induction coil and a receiving induction coil;
   the transmitting induction coil is stationary;
   and the receiving induction coil is mounted on the hollow shaft.

3. The analyzer of technological surfaces of claim 1 wherein
   the optical transmitter is an optical fiber cable.

4. The analyzer of technological surfaces of claim 1 wherein
   the optical transmitter is a system of mirrors.

5. The analyzer of technological surfaces of claim 3 wherein
   the radiation collector is an end face of the optical fiber cable.

6. The analyzer of technological surfaces of claim 1 wherein
   the radiation collector is an optical lens.

7. The analyzer of technological surfaces of claim 1 wherein
   the radiation collector is a focusing ellipsoidal or parabolic mirror of a rotational form.

8. The analyzer of technological surfaces of claim 1 wherein
   the radiation collector focuses the collected portion of the scattered laser radiation before the photodetector in a conjugate focal plane of the analyzed technological surface;
   and the scanner further comprises a pinhole aperture installed in the conjugate focal plane coaxially with the optical path of the collected portion of the scattered laser radiation conveyed to the photodetector.

9. The analyzer of technological surfaces of claim 1 wherein
   the laser module is directed onto analyzed technological surface with a laser beam angle of incidence from 45° to 85°.

10. The analyzer of technological surfaces of claim 1 wherein
an analyzed technological surface is held stationary;
and the transport system provides a relative motion between the scanner and an analyzed technological surface by moving the scanner.

11. The analyzer of technological surfaces of claim 1 wherein
the scanner is stationary;
and the transport system provides a relative motion between the scanner and an analyzed technological surface by moving an analyzed technological surface.

12. The analyzer of technological surfaces of claim 1 wherein
the transport system provides a relative motion between the scanner and an analyzed technological surface in a linear direction.

13. The analyzer of technological surfaces of claim 1 wherein
the relative motion provided between the scanner and an analyzed technological surface by the transport system is a rotation about an axis parallel to and not coinciding with the spin axis of the hollow shaft.

14. The analyzer of technological surfaces of claim 1 wherein
the scanner is a component of an equipment unit for fabrication or processing of workpieces.

15. The analyzer of technological surfaces of claim 14 wherein
the equipment unit is used for processing semiconductor wafers.

16. The analyzer of technological surfaces of claim 14 wherein
the equipment unit is used for processing photolithography masks.

17. The analyzer of technological surfaces of claim 14 wherein
the scanner is configured for in-situ inspection of processed workpieces.

18. The analyzer of technological surfaces of claim 14 wherein
the scanner is configured for inspecting equipment surfaces to monitor or diagnose the performance, condition or health of the equipment unit.

19. The analyzer of technological surfaces of claim 14 wherein
the scanner is configured for inspecting a test or witness workpiece to monitor or diagnose the performance, condition or health of the equipment unit.

20. The analyzer of technological surfaces of claim 14 wherein
the transport system is shared with the equipment unit to provide workpiece and equipment part movements during workpiece processing.

* * * * *